United States Patent
Bürge et al.

(10) Patent No.: US 10,851,023 B2
(45) Date of Patent: Dec. 1, 2020

(54) ACCELERATOR

(71) Applicant: SIKA TECHNOLOGY AG, Baar (CH)

(72) Inventors: Christian Bürge, Schafisheim (CH); Gilbert Mäder, Marthalen (CH); Franz Wombacher, Jonen (CH)

(73) Assignee: SIKA TECHNOLOGY AG, Baar (CH)

( * ) Notice: Subject to any disclaimer, the term of this patent is extended or adjusted under 35 U.S.C. 154(b) by 58 days.

(21) Appl. No.: 16/084,202

(22) PCT Filed: Mar. 21, 2017

(86) PCT No.: PCT/EP2017/056744
§ 371 (c)(1),
(2) Date: Sep. 11, 2018

(87) PCT Pub. No.: WO2017/162699
PCT Pub. Date: Sep. 28, 2017

(65) Prior Publication Data
US 2019/0071368 A1 Mar. 7, 2019

(30) Foreign Application Priority Data
Mar. 22, 2016 (EP) .................. 16161766

(51) Int. Cl.
| | | |
|---|---|---|
| *C04B 40/00* | (2006.01) | |
| *C04B 28/02* | (2006.01) | |
| *C04B 22/06* | (2006.01) | |
| *C04B 22/10* | (2006.01) | |
| *C04B 24/00* | (2006.01) | |
| *C04B 28/04* | (2006.01) | |
| *C04B 103/14* | (2006.01) | |

(52) U.S. Cl.
CPC ........ *C04B 40/0039* (2013.01); *C04B 22/064* (2013.01); *C04B 22/10* (2013.01); *C04B 24/003* (2013.01); *C04B 28/02* (2013.01); *C04B 28/04* (2013.01); *C04B 2103/14* (2013.01)

(58) Field of Classification Search
CPC ..... C04B 22/10; C04B 22/064; C04B 24/003; C04B 28/02; C04B 28/04; C04B 40/0039; C04B 2103/14
See application file for complete search history.

(56) References Cited

U.S. PATENT DOCUMENTS

| | | | | |
|---|---|---|---|---|
| 7,182,808 | B2* | 2/2007 | Angelskaar | C04B 40/0039 |
| | | | | 106/823 |
| 8,092,592 | B2* | 1/2012 | Buerge | C04B 24/003 |
| | | | | 106/806 |
| 2017/0073267 | A1* | 3/2017 | Gallucci | C04B 24/003 |

FOREIGN PATENT DOCUMENTS

| | | |
|---|---|---|
| EP | 0 465 991 A1 | 1/1992 |
| EP | 1 348 729 A1 | 10/2003 |
| EP | 138 697 B1 | 11/2003 |
| EP | 1 061 089 B1 | 3/2004 |
| EP | 2 128 110 A1 | 12/2009 |
| EP | 2 468 696 A1 | 6/2012 |
| EP | 2 522 680 A1 | 11/2012 |
| RU | 2341624 C2 | 12/2008 |
| WO | 2003/000617 A1 | 1/2003 |
| WO | 2015/078985 A1 | 6/2015 |
| WO | 2015/177232 A1 | 11/2015 |

OTHER PUBLICATIONS

Sep. 25, 2018 International Preliminary Report on Patentability issued in International Patent Application No. PCT/EP2017/056744.
Jun. 7, 2017 International Search Report issued in International Patent Application No. PCT/EP2017/056744.
English Translation dated Jul. 3, 2020 Office Action issued in Russian Patent Application No. 2018127551103.

* cited by examiner

*Primary Examiner* — Anthony J Green
(74) *Attorney, Agent, or Firm* — Oliff PLC

(57) ABSTRACT

A hardening accelerator for mineral binder compositions, in particular for cementitious binder compositions, including at least one phosphoric acid ester of a polyvalent alcohol and at least one alkali metal carbonate.

11 Claims, No Drawings

ACCELERATOR

TECHNICAL FIELD

The invention relates to hardening accelerators for mineral binders, to corresponding compositions comprise mineral binders, and to shaped bodies produced therefrom. Further, the invention pertains to uses and methods for accelerating hardening of a mineral binder and for producing a composition comprising at least one mineral binder. Moreover, the invention relates to the uses of selected substances for reducing the influence of magnesium carbonate on accelerated admixtures and for improving the effect of an accelerating admixture in mineral binder compositions comprising magnesium carbonate.

PRIOR ART

The production of cement generates a considerable amount of $CO_2$, which is of relevance to the climate. In order to reduce $CO_2$ emissions, cement in binder compositions can be partly replaced by latent hydraulic and/or pozzolanic cement admixtures, as for example fly ashes, slags or silica dust. Admixtures of this kind are byproducts of various industrial processes and are therefore advantageous in relation to the $CO_2$ balance. However, this setting of cement admixtures of this kind, without additional measures, takes much longer than in the case of hydraulic cement. This is disadvantageous especially with regard to high early strengths of binder compositions. It is therefore necessary to accelerate the setting and hardening of binder compositions comprising latent hydraulic and/or pozzolanic admixtures.

A similar problem arises in the production of prefabricated components made from unreinforced or steel-reinforced concrete, and also in trafficway or track renovation works. In these applications, typically, a high early strength is required, so that the prefabricated components after just a few hours can be taken out of the formwork, transported, stacked or prestressed, and the trafficways or tracks can be driven over by traffic or exposed to loading. With certain applications, therefore, an acceleration of the hardening process as well is desirable or necessary.

In order to achieve this objective in practice, alongside highly performing concrete formulations, with—for example—low w/c levels or high cement contents, special-purpose substances are used that accelerate the hardening of mineral binders, especially cementitious binders. Common examples are hardening accelerators based on amino alcohols, halides, pseudohalides, nitrites, nitrates, aluminum salts, glycols, glycerol, or α-hydroxycarboxylic acids.

Many of the hardening accelerators known at present relate to sprayed concrete. The effect of these accelerators is that, following addition of the accelerator, the cement or concrete mixtures set very rapidly, something which is usually also desirable in the case of sprayed concrete applications. But if the mineral binder compositions have to be processed still further after they have been mixed, known accelerator systems of this kind are therefore hardly suitable.

WO 2003/000617 A1 (Sika AG) describes, for example, a hardening accelerator for mineral binder compositions that is based on an alkanol amine, an inorganic nitrate, a carboxylic acid, and a polyol.

Likewise known are accelerators of the kind described in EP 2 128 110 A1 (Sika Technology AG). Systems of this kind are based on esters of polyhydric alcohols, which permit a high early strength without an excessive adverse effect on the working time or the ultimate strength.

Known accelerators, while mostly being entirely active, nevertheless frequently have the disadvantage that they are expensive, exhibit a limited field of use, and in some cases have a strongly adverse effect on the working time and the ultimate strengths of mortar and concrete. It has emerged, moreover, that the effect of accelerators of the kind described in EP 2 128 110 A1, for example, may be dependent on the quality of the aggregates in the binder composition.

There continues, therefore, to be a need for new and improved solutions which as far as possible overcome the disadvantages identified above.

SUMMARY OF THE INVENTION

It is an object of the present invention, therefore, to provide an improved hardening accelerator for mineral binders. Relative to known hardening accelerators, the hardening accelerator of the invention is intended to allow mortar and/or concrete compositions to have—in particular—higher early compressive strengths. Moreover, the hardening accelerator is intended to have as small as possible an adverse effect on the workability of mixed mineral binder compositions. Likewise desirable is a hardening accelerator whose effect is very largely independent of the quality of the aggregates in the binder composition. Furthermore, the intention is to provide corresponding methods and uses which enable these aims to be achieved as effectively as possible.

Surprisingly it has been found that the object of the invention can be achieved, in respect of the hardening accelerator, by an accelerator as claimed in claim 1.

Accordingly, the hardening accelerator of the invention comprises at least one phosphoric acid ester of a polyhydric alcohol and at least one alkali metal carbonate.

As has been found, the combination of the at least one phosphoric acid ester of a polyhydric alcohol and the at least one alkali metal carbonate, in accordance with the invention, allows the compressive strength of mineral binder compositions to be increased significantly, particularly 4-8 hours after the mixing. The substances used in accordance with the invention may interact functionally here, such that a more strongly accelerating effect is achieved than with the individual substances alone. Moreover, the hardening accelerators of the invention are extremely interesting in relation to the cost/performance ratio. It has further been found that the hardening accelerators of the invention are much less problematic than known accelerators in relation to unwanted stiffening behavior on the part of mineral binders or mineral binder compositions, especially cementitious systems.

In comparison to unaccelerated mineral binder compositions, the accelerators of the invention in practice allow prefabricated components produced to be subjected to load or deshuttered much earlier, for example. At the same time, however, the workability of the compositions accelerated in accordance with the invention is nevertheless retained over a relatively long period at a level which is appropriate for practice.

It has been found, furthermore, that in wide ranges, the hardening accelerators of the invention are effective independently of the quality of the aggregates used. In particular it has emerged that even the presence of magnesium carbonate, which in limestone fillers or sands, for example, may occur as a secondary constituent with a fraction of up to several percent by weight, has little adverse effect or none at all on the effect of the hardening accelerators.

With the hardening accelerators of the invention, furthermore, it is possible as and when required to do without possibly problematic substances such as chlorides, nitrates, nitrites, and thiocyanates, and to do so without having to accept significant detractions in relation to the accelerating effect.

Further aspects of the invention are subjects of further independent claims. Particularly preferred embodiments of the invention are subjects of the dependent claims.

Certain Embodiments of the Invention

In a first aspect, the invention relates to a hardening accelerator for mineral binders or mineral binder compositions, more particularly cementitious binder compositions, comprising at least one phosphoric acid ester of a polyhydric alcohol and at least one alkali metal carbonate.

The expression "mineral binder" refers in particular to a binder which reacts in the presence of water in a hydration reaction to form solid hydrates or hydrate phases. This binder may be, for example, a hydraulic binder (e.g., cement or hydraulic lime), a latent hydraulic binder (e.g., slag), a pozzolanic binder (e.g., fly ash), or a nonhydraulic binder (gypsum or white lime). A "mineral binder composition", accordingly, is a composition comprising at least one mineral binder.

A "cementitious binder" or a "cementitious binder composition" refers currently in particular to a binder or a binder composition having a cement clinker fraction of at least 5 wt %, more particularly at least 20 wt %, preferably at least 35 wt %, especially at least 65 wt %. The cement clinker is preferably a Portland cement clinker. By cement clinker in the present context is meant, in particular, ground cement clinker.

The mineral binder or the binder composition more particularly comprises a hydraulic binder, preferably cement. Particularly preferred is a cement having a cement clinker fraction of ≥35 wt %, In particular the cement is of type CEM I, II or III, preferably cement of type CEM I (according to standard EN 197-1). A fraction of the hydraulic binder within the total mineral binder is with advantage at least 5 wt %, more particularly at least 20 wt %, preferably at least 35 wt %, especially at least 65 wt %. According to one further advantageous embodiment, the mineral binder consists of at least 95 wt % of hydraulic binder, more particularly of cement clinker.

It may, however, also be advantageous if the binder composition comprises other binders additionally to or instead of a hydraulic binder. Such other binders are, in particular, latent hydraulic binders and/or pozzolanic binders.

Suitable latent hydraulic and/or pozzolanic binders are, for example, slag, fly ash and/or silica dust. The binder composition may also include inert substances such as finely ground limestone, finely ground quartz and/or pigments, for example. In one advantageous embodiment the mineral binder comprises 5-95 wt %, more particularly 5-65 wt %, especially 15-35 wt % of latent hydraulic and/or pozzolanic binders.

In particular the mineral binder composition, based in each case on the binder content, comprises 0.001-3 wt %, more particularly 0.01-1 wt %, especially 0.1-0.5 wt % of magnesium carbonate.

The term "hardening accelerator" is used in particular for a substance which, if added to a mineral binder and compared with a reference sample without added substance and/or without hardening accelerator, leads to an increase in the compressive strength of the mineral binder after a defined point in time after mixing, especially after 4-8 hours, in particular after 6-8 hours. The compressive strengths are determined in particular in accordance with standard EN 12390-3.

The term "polyhydric alcohol" refers to a hydroxy-functional compound with more than one hydroxyl group—for example, having two, three, four or five hydroxyl groups. Particularly preferred is an alcohol having three hydroxyl groups, this being a trihydric alcohol. Examples of suitable alcohols are polyhydric alkyl alcohols such as propanediol, butanediol, glycerol, diglycerol, polyglycerol, trimethylolethane, trimethylolpropane, 1,3,5-pentanetriol, erythritol, pentaerythritol, dipentaerythritol, sorbitol, sorbitan, glucose, fructose, sorbose, or isosorbide. Particularly preferred is glycerol.

The above-stated phosphoric acid ester of a polyhydric alcohol is obtained by esterification of a polyhydric alcohol with phosphoric acid and/or with a salt of phosphoric acid. The ester is preferably a part-ester or partial ester of a polyhydric alcohol, preferably of a trihydric alcohol. The term "part-ester or partial ester of a polyhydric alcohol" is understood to mean that in addition to one or more ester bonds, the polyhydric alcohol also has one or more free hydroxyl groups. The ester may be a mono-, di- or triester. A monoester is preferred, preferably a monoester of a di- or trihydric alcohol, more preferably of a trihydric alcohol, especially preferably of glycerol.

The phosphoric acid for preparing the ester may be present in the form of free acid or else as a salt or partial salt, with the term "salt" here and hereinafter referring to the product of a neutralization reaction of the phosphoric acid with a base, and of the phosphates which form after drying. "Partial salt" means that not all of the acid functions of the phosphoric acid have been neutralized.

Any remaining free acid groups of the phosphoric acid ester are preferably wholly or partially neutralized, so that there is a metal salt, more particularly an alkali metal and/or alkaline earth metal salt. The salt especially is a salt of a mono- or polyvalent cation, preferably a sodium, potassium, calcium, magnesium, zinc and/or aluminum salt, more preferably a sodium and/or aluminum salt. In a basic aqueous medium, the free acid groups may of course also be present in a deprotonated, anionic form.

Examples of suitable phosphoric acid esters for the hardening accelerator of the invention are glycerol phosphates. Glycerol monophosphate is preferred; particular preference is given to glycerol 2-phosphate, glycerol 3-phosphate and/or hydrates thereof.

The term "carbonate" refers presently to salts and/or esters of carbonic acid ($H_2CO_3$). The species in question more particularly are salts. Deriving from the two-proton (dibasic) carbonic acid there are two series of salts: (i) the hydrogen carbonates, which are also called primary carbonates ($MHCO_3$; based on the hydrogen carbonate anion $HCO_3^-$) and (ii) the secondary carbonates ($M_2CO_3$; based on the carbonate anion $CO_3^{2-}$). "M" here is a metal ion or a mixture of different metal ions, presently an alkali metal ion or a mixture of different alkali metal ions.

In the present context, secondary carbonates ($M_2CO_3$) have emerged as being preferred. Accordingly, the alkali metal carbonate is preferably a secondary carbonate or a compound of the formula $M_2CO_3$.

More particularly the alkali metal of the at least one alkali metal carbonate comprises sodium and/or potassium. In particular, the at least one alkali metal carbonate comprises sodium carbonate ($Na_2CO_3$) and/or potassium carbonate ($K_2CO_3$). Especially preferred is sodium carbonate ($Na_2CO_3$).

According to one advantageous embodiment, the at least one phosphoric acid ester comprises glycerol phosphate, disodium glycerol phosphate and/or a hydrate thereof, and the at least one alkali metal carbonate comprises sodium carbonate ($Na_2CO_3$) and/or potassium carbonate ($K_2CO_3$). With very particular preference the compound in question is sodium carbonate ($Na_2CO_3$). Accelerators of these kinds have proven particularly effective without substantially detracting from the workability of mineral binder compositions.

In the case of the hardening accelerator of the invention or in the case of the use thereof, there is preferably a weight ratio of the at least one phosphoric acid ester of a polyhydric alcohol to the at least one alkali metal carbonate in the range of 1:1-10:1, preferably 1.5:1-5:1, more particularly 2:1-3:1. This results in particularly strong hardening accelerations, especially after 4-8 days, and at the same time the workability of the binder compositions can be maintained within a range which is relevant for practice.

It has emerged as being advantageous, moreover, if the hardening accelerator additionally comprises at least one calcium compound. The calcium compound is preferably an inorganic calcium salt, an organic calcium salt and/or a mixture of inorganic and organic calcium salts.

The salt in question is, for example, a calcium salt based on the anions oxide, hydroxide, sulfate, sulfide, carbonate, hydrogen carbonate, chloride, fluoride, bromide, iodide, carbide, nitrate, nitrite, bromate, iodate, phosphate, phosphite, lactate, acetate, gluconate, stearate, citrate, propionate, mixtures thereof, and/or hydrates of these salts. Particularly preferred are calcium oxide, calcium hydroxide, and/or hydrates thereof. More particularly the calcium compound comprises calcium oxide.

Especially preferred are calcium compounds which in the form of solids, such as powders, for example, have a high specific surface area. This means in the present case a preferred specific surface area, measured by the BET method ($N_2$ adsorption, measured according to DIN ISO 9277), of between 1 and 50 $m^2/g$ calcium compound, preferably between 1.5 and 30 $m^2/g$, more particularly between 1.9 and 10 $m^2/g$ calcium compound.

In one preferred embodiment, the calcium compound is used in solid form. In this case it is advantageous, as described above, to use a solid having a high specific surface area. A high specific surface area results in an improvement in the accelerator effect. In order to obtain the same acceleration effect, it is possible to use proportionally less of a calcium compound having a high specific surface area as compared with a calcium compound having a low specific surface area. It is therefore preferred for the purposes of the present invention to use the calcium compound in an amount such as to result in a ratio of the total surface area of the calcium compound to the amount of mineral binder of approximately 50 to 70 $m^2/kg$ binder, preferably approximately 55 to 65 $m^2/kg$ binder, more preferably approximately 57 to 63 $m^2/kg$ binder. The total surface area of the calcium compound in this context refers to the mathematical product of the specific surface area (in $m^2/g$; according to BET ($N_2$ adsorption, measured according to DIN ISO 9277)) and the quantity used (in grams per kg of mineral binder).

In this embodiment, the amount of the phosphoric acid ester to the amount of the calcium compound is preferably adapted such that 0.001 to 0.05, preferably 0.005 to 0.04, more preferably 0.008 to 0.02 g of phosphoric acid ester is used per $m^2$ of calcium compound.

A weight ratio of the at least one calcium compound to the at least one phosphoric acid ester of a polyhydric alcohol is with advantage in the range of 100:1-1:1, preferably 50:1-5:1, more particularly 30:1-10:1. Ratios of this kind result in optimum acceleration effects in conjunction with good workability of the binder compositions.

According to a further advantageous embodiment, the hardening accelerator of the invention is used in combination with, or comprises, at least one further hardening-accelerating substance. In principle it is possible in this case to employ a multiplicity of substances known to the person skilled in the art. With particular advantage, however, the further hardening-accelerating substance comprises one or more of the following representatives:

a) one or more further amino alcohols and/or salts thereof
b) one or more alkali metal and/or alkaline earth metal nitrates
c) one or more alkali metal and/or alkaline earth metal nitrites
d) one or more alkali metal and/or alkaline earth metal thiocyanates
e) one or more α-hydroxycarboxylic acids
f) one or more alkali metal and/or alkaline earth metal halides
g) glycerol and/or glycerol derivatives
h) one or more glycols and/glycol derivatives
i) one or more aluminum salts
j) one or more alkali metal and/or alkaline earth metal hydroxides As has been found, the hardening accelerators of the invention are generally highly compatible with these representatives of further hardening-accelerating substances. It is possible accordingly, for example, to realize flexible adaptation to specific uses.

It may also be advantageous if the hardening accelerator is used in combination with at least one admixture, as for example a concrete admixture and/or a mortar admixture, or process chemicals. The at least one admixture comprises in particular a defoamer, a dye, a preservative, a plasticizer, a retardant, an air entrainer, a shrinkage reducer and/or a corrosion inhibitor, or combinations thereof.

With advantage the hardening accelerator is used together with, or comprises, a plasticizer or superplasticizer. Examples of suitable plasticizers include lignosulfonates, sulfonated naphthalene-formaldehyde condensates, sulfonated melamine-formaldehyde condensates, sulfonated vinyl copolymers, polycarboxylates, polycarboxylate superplasticizers, or mixtures thereof.

The plasticizer especially comprises a polycarboxylate, more particularly a polycarboxylate ether. The plasticizer more particularly is a comb polymer comprising a polycarboxylate backbone with polyether side chains bonded to it. The side chains here are bonded to the polycarboxylate backbone in particular via ester, ether, imide and/or amide groups.

Advantageous plasticizers are, for example, copolymers of (meth)acrylic acid monomers and/or maleic acid monomers and also monomers selected from polyalkylene glycol vinyl ethers, polyalkylene glycol (meth)allyl ethers, or polyalkylene glycol isoprenyl ethers. Particularly suitable are, for example, copolymers of maleic acid or derivatives thereof, allyl ethers, especially allyl polyethylene glycols, and vinyl acetate. Corresponding copolymers and their preparation are described for example in EP 2 468 696 A1 (Sika Technology AG). Especially suitable, for example, are the copolymers P-1 to P-4 as described in paragraphs 0058 to 0061 and table 1 of EP 2 468 696 A1.

Likewise suitable are, for example, copolymers of maleic acid or derivatives thereof, allyl ethers, especially allyl polyethylene glycols, and (meth)acrylic acid. Copolymers of this kind and their preparation are described in EP 2 522 680 A1 (Sika Technology AG). Advantageous copolymers, for example, are the copolymers P-1 to P-4 as described in paragraphs 0063 to 0070 and table 1 of EP 2 522 680 A1.

Furthermore, suitable polycarboxylate ethers and preparation processes are disclosed for example in EP 1 138 697 B1 on page 7 line 20 to page 8 line 50, and also in the examples thereof, or in EP 1 061 089 B1 on page 4, line 54 to page 5 line 38, and also in the examples thereof. In a modification thereof, as are described in EP 1 348 729 A1 on page 3 to page 5 and also in the examples thereof, the comb polymer may be prepared in the solid aggregate state.

The disclosure contents of the patent specifications identified in connection with the plasticizers is hereby incorporated in particular by reference.

Corresponding comb polymers are also sold commercially by Sika Schweiz AG under the trade name series of ViscoCrete®.

In particular, a weight ratio of the at least one plasticizer to the at least one phosphoric acid ester of a polyhydric alcohol is in the range of 1:1-10:1, preferably 1.5:1-5:1, more particularly 2:1-3:1. This allows good plasticizing effects to be achieved in conjunction with effective acceleration of hardening. The plasticizer here has hardly any adverse effect, or none at all, on the effect of the hardening accelerator.

The hardening accelerator may in principle be in any of a wide variety of different forms. In particular, the individual components of the hardening accelerator may be present physically alongside one another as individual components, more particularly as what is called a "kit-of-parts". It is, however, also possible for some or all of the components of the accelerator to be premixed in solid and/or liquid form.

If the hardening accelerator comprises a calcium compound, especially calcium oxide and/or calcium hydroxide, the hardening accelerator is advantageously in the form of an at least two-component hardening accelerator. In this case the calcium compound is in a first component, while the at least one phosphoric acid ester of a polyhydric alcohol and the at least one alkali metal carbonate are present together in a second component or are present separately from one another as further individual components. By this means it is possible to improve the storage stability, for example.

In particular, the components of the at least two-component accelerator are physically separate—for example, in at least two individual containers or in one container having at least two physically separated areas.

Any further components, such as a plasticizer, for example, may be in the first component and/or in a second component, and/or in a further, physically separate component. The further component may for example be in a further individual container or in a further physically separate area of a container having a plurality of physically separate areas.

The hardening accelerator or one or more of the accelerator components may be present in liquid and/or in solid form. If the hardening accelerator or the accelerator components are present in liquid form, the forms in question are, in particular, aqueous solutions or aqueous dispersions. Where the hardening accelerator or one or more of the accelerator components is or are present in solid form, they are employed, for example, as powders, pellets, flakes, and/or applied on a solid carrier material.

According to one advantageous embodiment, the phosphoric acid ester of a polyhydric alcohol and the alkali metal carbonate are in liquid form, more particularly as aqueous solution or aqueous dispersion. This simplifies the addition, metering, and mixing when mixing up the binder composition. A fraction of the phosphoric acid ester of a polyhydric alcohol and a fraction of the alkali metal carbonate in aqueous solutions or dispersions here are more particularly in each case 1-50 wt %, preferably 2-25 wt % or 5-15 wt %, based on the total weight of the aqueous solution or of the dispersion. More particularly the phosphoric acid ester of a polyhydric alcohol and the alkali metal carbonate are present together in an aqueous solution or dispersion. If present, the calcium compound here is present as a separate component and, as described above, in the form of a solid. The calcium compound may therefore be added to a mineral binder composition, in particular even before the addition of mixing water.

In a further aspect, the present invention relates to a composition comprising a mineral binder and a hardening accelerator as described above. The mineral binder here is as defined above. The composition may take the form, for example, of a dry composition or of a fluid or stiffened binder composition mixed up with mixing water. The composition may also take the form of a fully cured binder composition—for example, a shaped body.

This composition preferably comprises, based on the weight of the binder:
a) the phosphoric acid ester in an amount of 0.001 to 2 wt %, preferably 0.005 to 1 wt %, more preferably 0.01 to 0.6 wt % or 0.1 to 0.3 wt %;
b) the alkali metal carbonate in an amount of 0.001 to 6 wt %, preferably 0.01 to 1 wt %, more preferably 0.02 to 0.1 wt % or 0.04-0.08 wt %;
c) optionally the calcium compound with a fraction of 0.001 to 10 wt %, preferably 0.1 to 5 wt %, more preferably 1 to 4 wt %.

In particular, moreover, the composition comprises a plasticizer as described above. If present, the plasticizer, based on the mineral binder, has advantageously a proportion of 0.01-6 wt %, more particularly 0.1-4 wt %, more preferably 0.5-3 wt %. On the basis of the combination with the plasticizer, it is possible to improve the workability of the binder composition and at the same time higher compressive strengths are achieved, the latter in particular also at late times, e.g., after 28 days.

Optionally, moreover, an admixture as described above, particularly a concrete admixture and/or a mortar admixture, and/or a further hardening-accelerating substance is present in the composition.

Aside from specific uses, it is in general particularly advantageous if the hardening accelerators of the invention are not combined with certain substances. In particular, the hardening accelerators of the invention include no additional nitrates and/or nitrites, owing in particular to the toxicity and corrosiveness of such compounds. Similarly, the hardening accelerators of the invention advantageously contain no additional thiocyanates. Thiocyanates are a health hazard and are likewise problematic from the standpoint of corrosion. Moreover, it may in particular also be advantageous if the hardening accelerators of the invention contain no additional halides, alkali metal hydroxides, aluminum salts, glycerol and/or α-hydroxycarboxylic acids. For specific application, the hardening accelerator may nevertheless be combined with such substances.

In an additional aspect, the invention relates to a method for accelerating the hardening of a mineral binder composition, particularly after 4-8 hours, and/or for producing a composition comprising at least one mineral binder, where a phosphoric acid ester of a polyhydric alcohol and an alkali metal carbonate are added together and/or separately from one another to a mineral binder.

The phosphoric acid ester of the polyhydric alcohol and the alkali metal carbonate here are defined as above and are present in particular in the form of a hardening accelerator as described above.

The phosphoric acid ester here, based on the mineral binder content, is used in particular in an amount of 0.001 to 2 wt %, preferably 0.01 to 1 wt %, more preferably 0.02 to 0.6 wt %. The alkali metal carbonate, based on a mineral binder content, is used advantageously in an amount of 0.001 to 10 wt %, preferably 0.1 to 5 wt %, more preferably 0.5 to 3 wt %.

Added optionally is a calcium compound as described above, with a fraction of 0.001 to 10 wt %, preferably 0.1 to 5 wt %, more preferably 0.5 to 3 wt %, based on the mineral binder content.

Admixed in particular, moreover, is a plasticizer as described above, in particular with a fraction of 0.01-6 wt %, especially 0.1-4 wt %, more preferably 0.5-3 wt %, based on the mineral binder content.

It is optionally possible, moreover, to add an admixture as described above, more particularly a concrete admixture and/or a mortar admixture, and/or a further hardening-accelerating substance.

The phosphoric acid ester of the polyhydric alcohol and the alkali metal carbonate or the hardening accelerator may in principle be added to the mineral binder at any point in time before or during the mixing.

For example, the phosphoric acid ester of the polyhydric alcohol and the alkali metal carbonate or the hardening accelerator may be admixed at least partially, more particularly completely, to the mixing water and added with this water to the mineral binder on mixing. It is likewise possible for the phosphoric acid ester of the polyhydric alcohol and the alkali metal carbonate or the hardening accelerator to be mixed at least partially, more particularly completely, with the mineral binder directly, prior to the mixing, and only then for the mixing water to be added. The addition of the mixing water here may also take place with a time delay—for example, hours, days, or even months later.

According to a further variant, the phosphoric acid ester of the polyhydric alcohol and the alkali metal carbonate or the hardening accelerator may be added at least partially, more particularly completely, to the mineral binder before and/or during an operation of grinding the mineral binder. By this means the substances are mixed particularly well with the mineral binder and there is no need for an additional mixing operation. Surprisingly it has been found that the effect of the phosphoric acid ester of the polyhydric alcohol and of the alkali metal carbonate, or of the hardening accelerator, respectively, is not adversely affected by the grinding operation.

As already maintained above, it is in general particularly advantageous, leaving aside specific uses, if the hardening accelerators of the invention are not combined with certain substances. In particular, the hardening accelerators of the invention are used without additional nitrates and/or nitrites. Similarly, the hardening accelerators of the invention are advantageously used without additional thiocyanates. In particular it may also be advantageous, moreover, if the hardening accelerators of the invention are intended for use without additional halides, alkali metal hydroxides, aluminum salts, glycerol and/or α-hydroxycarboxylic acids.

An additional aspect of the present invention pertains to a shaped body which is obtainable by curing a composition as described above, comprising at least one mineral binder, after addition of water. The shaped body thus produced may have virtually any desired form and may for example be part of an edifice, such as of a building, of a masonry construction or of a bridge, for example.

In a further aspect, the present invention pertains to the use of a phosphoric acid ester of a polyhydric alcohol in combination with an alkali metal carbonate, more particularly in the form of a hardening accelerator as described above, for accelerating the hardening of mineral binders and/or binder compositions, more particularly mortar and/or concrete compositions.

The invention further relates to the use of an alkali metal carbonate for reducing the effect of magnesium carbonate on accelerating admixtures, more particularly phosphoric acid esters of the polyhydric alcohols, in a mineral binder composition comprising magnesium carbonate. As has been found, alkali metal carbonates, more particularly sodium carbonate ($Na_2CO_3$) and/or potassium carbonate ($K_2CO_3$), can be used specifically in order to reduce or to neutralize entirely the undesirable effect of magnesium carbonate consisting of at least partly impairing or eliminating the effect of accelerating admixtures in mineral binder compositions.

The invention further relates to the use of an alkali metal carbonate for improving the effect of an accelerating admixture, more particularly of a phosphoric acid ester of polyhydric alcohols, in a mineral binder composition comprising magnesium carbonate.

The phosphoric acid esters of polyhydric alcohols and alkali metal carbonates that are used are in this case defined as described above. Particular preference here is given to using glycerol phosphate, disodium glycerol phosphate and/or a hydrate as phosphoric acid esters of polyhydric alcohols. Particularly suitable alkali metal carbonates encompassed are sodium carbonate ($Na_2CO_3$) and/or potassium carbonate ($K_2CO_3$), in particular sodium carbonate ($Na_2CO_3$).

The working examples hereinafter provide further illustration of the invention.

WORKING EXAMPLES

1. Substances and Methods 1.1. Substances

Substances used for the working examples were as follows:

TABLE 1

Substances used

| Abbreviation | Substance |
|---|---|
| PCE | Polycarboxylate ether plasticizer (e.g., Sika ® Viscocrete ® 20 HE, available from Sika Schweiz AG); solids content: 40 wt % |
| GPD | Glycerol phosphate, disodium salt, pentahydrate (available from Sigma Aldrich Schweiz); 10 wt % in $H_2O$ |
| NaCt | Sodium carbonate; 10 wt % in $H_2O$ |
| KCt | Potassium carbonate; 10 wt % in $H_2O$ |

TABLE 1-continued

Substances used

| Abbreviation | Substance |
|---|---|
| MgCt | Magnesium carbonate; 10 wt % in $H_2O$ |
| CaOx | Calcium oxide (Nekafin ® 2 from Kalkfabrik Netstal AG, Switzerland, having a specific surface area (BET) of 1.9 $m^2/g$) |

Sodium carbonate, potassium carbonate, and magnesium carbonate are available commercially from various suppliers in pure form (purity >97%). They were each dissolved in water in the quantity specified in table 1, and used in the form of aqueous solutions.

1.2 Mortar Mixtures

The mortar mixture M1 used has the dry compositions described in table 2.

TABLE 2

Dry composition of mortar mixture

| Component | M1 |
|---|---|
| Portland cement of type CEM I 52.5 N (Normo 5R; available from Holcim Schweiz) | 750 g |
| Limestone filler | 141 g |
| Sand 0-1 mm | 738 g |
| Sand 1-4 mm | 1107 g |
| Sand 4-8 mm | 1154 g |

To prepare the mortar mixtures, the sands, the limestone filler, the cement, and optionally calcium oxide (CaOx) were mixed dry in a Hobart mixer at a temperature of 20° C. for 1 minute. Over the course of 30 seconds, the mixing water (water/cement ratio or w/c=0.4), admixed beforehand with the polycarboxylate ether plasticizer (PCE; 1 wt % based on cement) and optionally further substances (GPD, NaCt, KCt, MgCt), was added and mixing was continued for 2.5 minutes more. The total wet mixing time lasted 3 minutes in each case.

1.3 Test Methods

To determine the activity of the hardening accelerators of the invention, a determination was made of the compressive strengths of different mortar mixtures at different times after the preparation of the mortar mixtures. The test for determining the compressive strength (in $N/mm^2$) took place on prisms (40×40×160 mm) in accordance with standards EN 12390-1 to 12390-4.

Immediately after the preparation of the mortar mixtures, measurements were also made of the respective slump (ABM). The slump (ABM) of the mortar mixtures was measured in accordance with EN 1015-3.

2. Mortar Test

Table 3 shows the negative influence of magnesium carbonate on the effect of hardening accelerators. The greater the amount of magnesium carbonate present, the lower the compressive strengths after 6 and 8 hours and the lower the accelerating effect of GPD and CaOx.

TABLE 3

Effect of magnesium carbonate

| No. | CaOx* | GPD* | MgCt* | ABM+ [mm] | Compressive strength [MPa] 6 h | 8 h |
|---|---|---|---|---|---|---|
| A1 | 3.00 | 1.50 | — | 192 | 4.0 | 10.3 |
| A2 | 3.00 | 1.50 | 0.27 | 187 | 1.8 | 5.7 |
| A3 | 3.00 | 1.50 | 0.53 | 180 | 1.3 | 4.1 |
| A4 | 3.00 | 1.50 | 0.80 | 175 | 1.3 | 4.1 |
| A5 | 3.00 | 1.50 | 1.07 | 142 | 1.1 | 2.3 |

*wt % based on cement content
+slump immediately after preparation

In the case of experiments B1-B6, shown in table 4, the effect of sodium carbonate in binder compositions comprising magnesium carbonate was investigated.

TABLE 4

Effect of sodium carbonate

| No. | CaOx* | GPD* | MgCt* | NaCt* | ABM+ [mm] | Compressive strength [MPa] 6 h | 8 h |
|---|---|---|---|---|---|---|---|
| B1 | 3.00 | 1.50 | — | — | 196 | 9.9 | 19.8 |
| B2 | 3.00 | 1.50 | 0.26 | — | 225 | 4.8 | 11.7 |
| B3 | 3.00 | 1.50 | 0.26 | 0.60 | 196 | 8.2 | 19.2 |
| B4 | 3.00 | 1.50 | 0.26 | 0.70 | 168 | 9.9 | 20.3 |
| B5 | 3.00 | 1.50 | 0.26 | 0.80 | 151 | 8.9 | 19.0 |
| B6 | 3.00 | 1.50 | 0.26 | 0.90 | 122 | 8.8 | 20.6 |

*wt % based on cement content
+slump immediately after preparation

From table 4 it is evident that the use of sodium carbonate (NaCt), is able to eliminate and/or neutralize the negative effects of magnesium carbonate (MgCt). Particularly advantageous in this case are concentrations of 0.06 and 0.07 wt % of sodium carbonate (or 0.6 and 0.7 wt % of the 10% NaCt solutions) (see experiments B3 and B4). Here, on the one hand high compressive strengths and at the same time good workabilities (high slump value) are achieved.

In the case of experiments C1-C6, presented in table 5, the effect of sodium carbonate in binder compositions comprising magnesium carbonate was investigated.

TABLE 5

Effect of potassium carbonate

| No. | CaOx* | GPD* | MgCt* | KCt* | ABM+ [mm] | Compressive strength [MPa] 4 h | 6 h | 8 h |
|---|---|---|---|---|---|---|---|---|
| C1 | 3.00 | — | — | — | 234 | 0.7 | 2.5 | 6.1 |
| C2 | 3.00 | 1.50 | — | — | 211 | 2.8 | 10.2 | 20.4 |
| C3 | 3.00 | 1.50 | 0.26 | — | 218 | 1.1 | 3.0 | 8.5 |
| C4 | 3.00 | 1.50 | 0.26 | 0.30 | 185 | 1.7 | 7.7 | 18.0 |
| C5 | 3.00 | 1.50 | 0.26 | 0.60 | 187 | 1.9 | 7.6 | 18.3 |
| C6 | 3.00 | 1.50 | 0.26 | 1.20 | 144 | 2.4 | 10.4 | 21.8 |

*wt % based on cement content
+slump immediately after preparation

Table 5 shows that potassium carbonate as well is able to very largely eliminate or to neutralize the negative effects of magnesium carbonate (MgCt). Particularly advantageous here are concentrations of 0.06 wt % of potassium carbonate (or 0.6 wt % of the 10% KCt solutions) (see experiment C5). Concentrations higher than in experiment C6 do produce better compressive strengths, but result in a less good workability (slump at 144 mm). A comparison of experiments C1 and C2 further demonstrates the accelerating effect of GPD.

Experiments D1-D4, presented in table 6, were all carried out without magnesium carbonate, and illustrate the interaction of alkali metal carbonates and phosphoric acid esters of polyhydric alcohols.

TABLE 6

Interaction of sodium carbonate with GPD

| No. | CaOx* | GPD* | MgCt* | NaCt* | ABM+ [mm] | Compressive strength [MPa] 6 h | 8 h |
|---|---|---|---|---|---|---|---|
| D1 | 3.00 | — | — | — | 234 | 0.5 | 0.6 |
| D2 | 3.00 | 1.50 | — | — | 165 | 0.9 | 1.5 |
| D3 | 3.00 | — | — | 0.60 | 232 | 0.5 | 0.6 |
| D4 | 3.00 | 1.50 | — | 0.60 | 190 | 1.6 | 4.5 |

*wt % based on cement content
+slump immediately after preparation

What table 6 shows, among other things, is that sodium carbonate as such has no accelerating effect (compare experiment D3 vs. experiment D1). From a comparison of experiments D2 and D3, however, it is apparent that through the interaction of sodium carbonate and GPD the accelerating effect of GPD is further greatly increased. This shows that alkali metal carbonates and phosphoric acid esters of polyhydric alcohols interact synergistically.

The above-described embodiments, however, are to be understood merely as illustrative examples, which may be modified as desired within the bounds of the invention.

Hence in the examples it is possible, for example, to leave out calcium oxide (CaOx) as additional component. This results in lower compressive strengths. In qualitative terms, however, there is no change to the activities and effects described.

It is likewise possible, for example, to replace the cement at least partially by a latent hydraulic and/or pozzolanic binder. It is also possible, additionally to or instead of the aggregates described (sands, limestone filler), to use larger aggregates, to obtain a concrete composition, for example. This does not result in any change to the activities and effects described above.

The invention claimed is:

1. A composition comprising at least one mineral binder and at least one hardening accelerator for mineral binders comprising at least one phosphoric acid ester of a polyhydric alcohol, at least one calcium compound, and at least one alkali metal carbonate; wherein the hardening accelerator is in the form of an at least two-component hardening accelerator, with the at least one calcium compound being present in a first component, while the at least one phosphoric acid ester of a polyhydric alcohol and the at least one alkali metal carbonate are present together in a second component or are present separately from one another as further individual components.

2. The composition as claimed in claim 1, comprising, based in each case on the weight of the binder:
   a) the at least one phosphoric acid ester of a polyhydric alcohol in an amount of 0.001 to 2 wt %,
   b) the at least one alkali metal carbonate in an amount of 0.001 to 6 wt %,
   c) the at least one calcium compound with a fraction of 0.001 to 10 wt %.

3. A method for reducing an influence of magnesium carbonate on accelerating admixtures, in a mineral binder composition comprising magnesium carbonate, and/or for improving an effect of an accelerating admixture in a mineral binder composition comprising magnesium carbonate, said method comprising addition of a hardening accelerator for mineral binders comprising at least one phosphoric acid ester of a polyhydric alcohol and at least one alkali metal carbonate to said mineral binder composition.

4. The method as claimed in claim 3, wherein the at least one phosphoric acid ester is a partial ester of a polyhydric alcohol.

5. The method as claimed in claim 3, wherein the at least one alkali metal carbonate comprises sodium carbonate ($Na_2CO_3$) and/or potassium carbonate ($K_2CO_3$).

6. The method as claimed in claim 3, wherein the at least one phosphoric acid ester comprises glycerol phosphate, disodium glycerol phosphate and/or a hydrate thereof and in that the at least one alkali metal comprises sodium carbonate ($Na_2CO_3$) and/or potassium carbonate ($K_2CO_3$).

7. The method as claimed in claim 3, wherein a weight ratio of the at least one phosphoric acid ester of a polyhydric alcohol to the at least one alkali metal carbonate is in the range of 1:1-10:1.

8. The method as claimed in claim 3, wherein the hardening accelerator additionally comprises at least one calcium compound.

9. The method as claimed in claim 8, wherein the at least one calcium compound comprises calcium oxide and/or calcium hydroxide.

10. The method as claimed in claim 8, wherein a weight ratio of the at least one calcium compound to the at least one phosphoric acid ester of a polyhydric alcohol is in the range of 100:1-1:1.

11. The method as claimed in claim 8, wherein the hardening accelerator is in the form of an at least two-component hardening accelerator, with the at least one calcium compound being present in a first component, while the at least one phosphoric acid ester of a polyhydric alcohol and the at least one alkali metal carbonate are present together in a second component or are present separately from one another as further individual components.

* * * * *